Patented May 23, 1939

2,159,569

UNITED STATES PATENT OFFICE 2,159,569

$\Delta^{4,5}$-UNSATURATED ANDROSTENE COMPOUND AND PROCESS OF MAKING SAME

Leopold Ruzicka, Zurich, Switzerland, assignor to the firm of Society of Chemical Industry in Basle, Basel, Switzerland No Drawing. Application September 8, 1936, Serial No. 99,860. In Switzerland November 4, 1935

6 Claims. (Cl. 260—397)

This invention is based on the observation that the double carbon bond of $\Delta^{5,6}$-dehydroandrosterone can be shifted to the $\Delta^{4,5}$-position by combining the compound with hydrogen halide and then eliminating the hydrogen halide.

Instead of dehydroandrosterone, compounds derived therefrom, for instance androstenediol-(3,17) or 17-methyl-androstene-diol-(3,17), as well as esters or ethers of these cyclic alcohols, can be similarly isomerized.

The elimination of hydrogen halide must be conducted under mild conditions in order to avoid a reversion of the double bond. The alkali metal salts of organic acids, for instance an alkali metal acetate, are particularly suitable for this purpose.

The new compounds find application in therapeutics.

The following examples illustrate the invention:

Example 1

2 grams of $\Delta^{5,6}$-trans-dehydroandrosterone are dissolved in 500 cc. of absolute ether and the solution is mixed with 500 cc. of a solution of hydrogen chloride in absolute alcohol saturated at 0° C. The mixture is allowed to stand for about 2 days at room temperature, or while cooling, and finally cautiously evaporated in a vacuum. The trans-dehydroandrosterone hydrochloride separates in the form of colorless crystals of melting point 156.5° to 157° C. It is freely soluble in petroleum ether, chloroform and benzene but sparingly soluble in alcohol.

2 grams of this hydrochloride are dissolved in 500 cc. of absolute alcohol and, after addition of 4 grams of freshly fused potassium acetate, the whole is heated on the water-bath for 6 hours. Potassium chloride separates. After addition of water the product of the reaction is extracted by means of ether. The ethereal solution is washed with water, then dried over sodium sulfate and evaporated in a vacuum. The residue is purified by recrystallization from hexane. The $\Delta^{4,5}$-trans-dehydroandrosterone forms colorless needles of melting point 129° to 130° C.

Instead of the hydrochloride the hydrobromide or hydroiodide of dehydroandrosterone may be used for the isomerization.

Example 2

5 grams of $\Delta^{5,6}$-androstene-3,17-diol are treated according to Example 1 in an ethereal solution with alcoholic hydrobromic acid. The $\Delta^{5,6}$-androstenediol-hydrobromide which has separated is boiled in an alcoholic solution with double the quantity of dry sodium acetate. Working up is as described in Example 1. The $\Delta^{4,5}$-androstene-3,17-diol forms colorless needles of melting point 158° C.

17-alkyl-$\Delta^{5,6}$-androstene-diols-(3,17), such as for example the 17-methyl or ethyl compounds, are converted in analogous manner into the corresponding $\Delta^{4,5}$-unsaturated compounds.

Instead of the free alcohols there may also be used any desired esters, such as for example the propionates, butyrates and valerianates, or also ethers, such as for example the methyl or ethyl ethers.

What I claim is:

1. The $\Delta^{4,5}$-unsaturated 3-hydroxy androstene-compounds.

2. The $\Delta^{4,5}$-trans-dehydroandrosterone of the formula

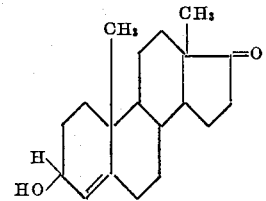

melting at 129° to 130° C.

3. The $\Delta^{4,5}$-androstene-3,17-diol of the formula

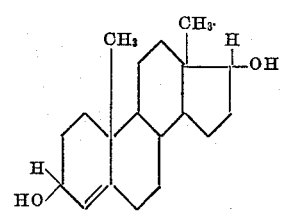

melting at 158° C.

4. A process for the manufacture of $\Delta^{4,5}$-androstene compounds, consisting in combining $\Delta^{5,6}$-androstene compounds with hydrogen halide and then eliminating the hydrogen halide under mild conditions with alkali metal salts of organic acids.

5. A process for the manufacture of $\Delta^{4,5}$-transdehydroandrosterone, consisting in combining Δ⁵,⁶-dehydroandrosterone of the formula

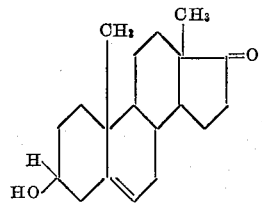

with hydrogen halide and then eliminating the hydrogen halide under mild conditions with alkali metal salts of organic acids.

6. A process for the manufacture of Δ⁴,⁵-androstene-3,17-diol, consisting in combining Δ⁵,⁶-androstene-3,17-diol of the formula

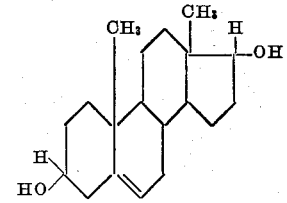

with hydrogen halide and then eliminating the hydrogen halide under mild conditions with alkali metal salts of organic acids.

LEOPOLD RUZICKA.